Feb. 3, 1970                L. R. TYLEY                   3,493,846
       POWER SUPPLY CIRCUIT CONTROLLED BY HEAT-SENSITIVE
                    ELECTRICAL RESISTANCE
Filed June 1, 1967                                3 Sheets-Sheet 1

United States Patent Office 3,493,846
Patented Feb. 3, 1970

3,493,846
POWER SUPPLY CIRCUIT CONTROLLED BY HEAT-SENSITIVE ELECTRICAL RESISTANCE
Leonard Richard Tyley, Chiswick, London, England, assignor to Diamond H Controls Limited, Norwich, England, a British company
Filed June 1, 1967, Ser. No. 642,758
Claims priority, application Great Britain, June 10, 1966, 25,939/66
Int. Cl. H02p 13/14, 13/16
U.S. Cl. 323—16                    9 Claims

ABSTRACT OF THE DISCLOSURE

Power is fed from an alternating current source at a controlled rate through one or more silicon-controlled rectifiers which are switched into their conducting conditions when half cycles of the supply are to be transmitted to a load. The switching is performed by firing pulses which are applied to each silicon-controlled rectifier when trigger pulses, of varying amplitude which is influenced by the temperature sensed by a heat-sensitive resistor, exceed a pre-arranged threshold value. The temperature-sensing resistor has its instantaneous ohmic value sensed by low energy current impulses which are synchronized to occur with the passage through zero of the power supply voltage. In this way the self-heating of the resistor is kept to a minimum, and the power supplied to the load corresponds closely to the theoretically required power.

---

Power control by silicon controlled rectifiers is now well known, the effective power being varied by causing the rectifier to conduct appropriately early or late in each half-cycle of the A.C. supply, using what is generally called phase control. The non-sinusoidal shape of the resulting current flow can give rise to problems of interference of radio and television reception, and of interference between otherwise separate phase-controlled circuits in that the firing of one circuit can seriously influence the firing of another circuit. Furthermore, widespread use of phase control of power, with its associated distorted waveforms, can give rise to generation and distribution problems.

It is an aim of this invention to provide a form of power control which is inherently less liable to produce interference of the forms mentioned, and avoiding the need for expensive suppressor circuits.

The form of current control produced by this invention avoids significant distortion of the waveform, the current flow being for a selected number of half-cycles out of a preferred number of cycles, say, out of 50 cycles, as a convenient figure. Thus current flow for two half-cycles in fifty cycles would provide 2% of the full heating power when considered for a heating application.

In this invention, single triggering pulses are produced timed to occur as the alternating supply voltage passes through its nodes. The amplitude of the individual pulses is arranged to vary over a chosen time base, e.g. to increase linearly from a small value to a high value over the chosen time base of, say, 50 cycles.

The invention will be further described with reference to the accompanying drawings.

Figure 1:
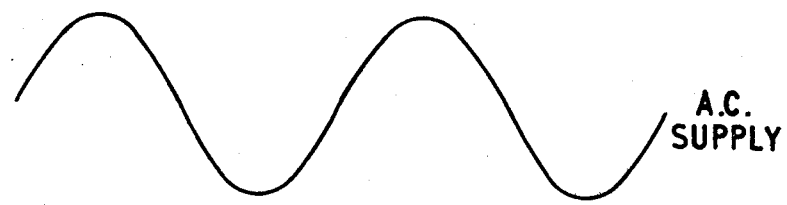
FIGURE 1 shows the waveform of a single phase A.C. supply.
Figure 2:
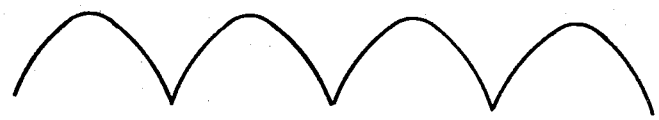
FIGURE 2 shows the waveform obtained by simply rectifying this.
Figure 3:
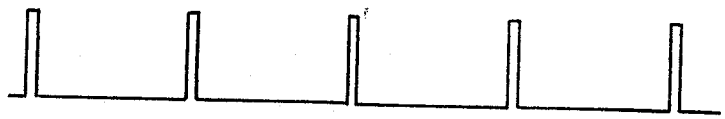
FIGURE 3 shows the basic pulse form of the triggering signals.
Figure 4:
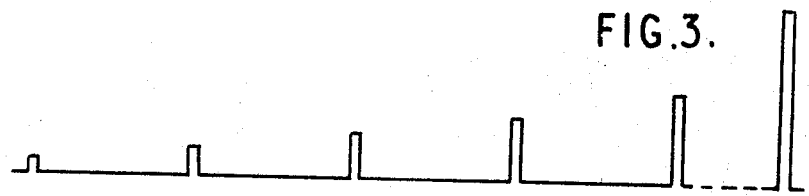
FIGURE 4 shows the pulse form of the triggering signals of gradually increasing amplitude according to the invention.

In FIGURE 1 there is shown the wave form of a single phase A.C. supply. In FIGURE 2 there is shown the effect on this waveform of rectification. In FIGURE 3 the waveform is shown converted into repetitive pulses of steady value and in FIGURE 4 the waveform in which the repetitive pulses steadily increase in value in a linear manner over a period of say, 50 cycles. To obtain this sequence of pulses the circuit shown in FIGURE 5 may be used. In this circuit a unijunction $T_1$ has its emitter connected between the collector of transistor $T_2$ and condenser C and also to the base of transistor $T_3$. The emitter of transistor $T_3$ is connected through diode $D_1$ to an output lead point.

The transistor $T_2$ and condenser C forms a substantially linear ramp generator, working in conjunction with the unijunction $T_1$ to discharge the condenser C after a time base period of typically 1 second.

Pulses from a monostable 100 cycles per second mains locked generator are applied at $P_{IN}$ to diode $D_2$. The diode $D_1$ clamps the output point $P_{OUT}$ to the instantaneous ramp voltage, so that when the ramp voltage is zero there is zero pulse output, and as the ramp voltage increases the pulse amplitude increases proportionally.

Figure 5:
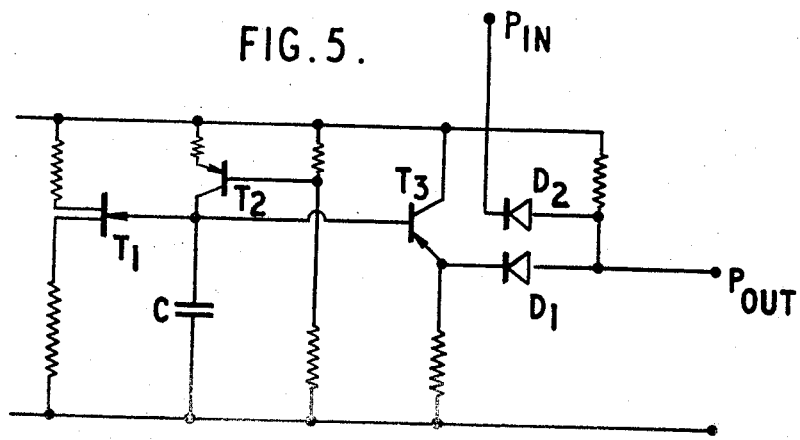
FIGURE 5 is a circuit diagram of one method of producing a ramp of pulses.
Figure 6:
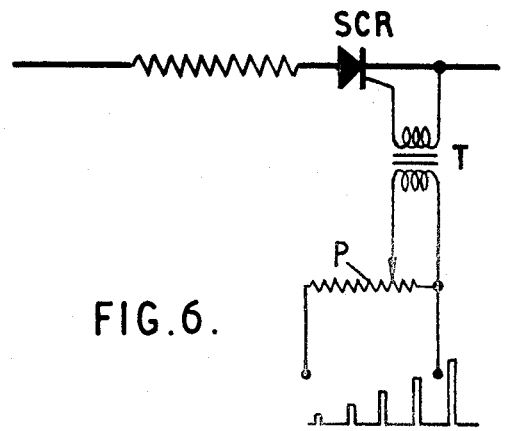
FIGURES 6 and 7 are circuit diagrams of applications of the invention.

In FIGURE 6 there is shown a trigger circuit in which the silicon controlled rectifier SCR is fed from a transformer T which is potentiometer fed from the ramp of pulses supplied from a circuit such as that of FIGURE 5.

The smallest pulse may be tall enough to trigger the controlled rectifier SCR; applied to the controlled rectifier without attenuation the smallest pulse will fire the controlled rectifier and so will each succeeding pulse throughout the time base. By attenuating the pulses to, say 50% of their normal amplitude by means of the manually adjustable potentiometer P, the firing of the controlled rectifier will be delayed until half way through the period of the time base. Thus manual control of the power is achievable by varying the degree of attenuation.

In a further application of the invention the linearly increasing pulses are added to further pulses which vary in amplitude in proportion to the temperature of a mass or space which is to be heated. One embodiment of this invention (FIGURE 7) uses a conventional bridge B, having at least one leg made up of a temperature sensitive resistance. This bridge is fed with constant voltage pulses, the pulses occurring at the same time as the supply mains voltage passes through its nodes.

Thus the same monostable generator which feeds pulses into $P_{IN}$ can be used to supply the steady level pulses to the temperature sensing bridge.

The output from this bridge is a series of pulses which vary in magnitude in proportion to the deviation from the desired value of temperature. These temperature-dependent pulses are added to the pulses which increase linearly during the time base period as previously described. The combination is arranged so that when the measured temperature is appreciably lower than the desired value firing occurs in every half-cycle; as the measured temperature rises firing occurs progressively later in the time base period so that the effective power applied is appropriately reduced.

The use of pulses to feed the temperature measuring bridge has a definite advantage when compared with the use of a conventional steady alternating current supply to the bridge as the power dissipated in the bridge legs is considerably reduced. The amount of power which has to be dissipated by the temperature sensing element may be less than 1% of the steady power needing to be dissipated for unbalance signals of equal amplitude. This considerable reduction in self-heating allows greater accuracy of temperature measurement to be achieved, this being of particular importance with fine wire platinum sensors and with thermistors including those of tin-oxide materials. Some sensing elements have extremely limited power dissipation capabilities, and the use of pulses makes it possible to use some temperature sensors which could not be used with steady power supplies because of gross overheating which would result, and because of the cumulative heating effect which is produced in negative temperature coefficient devices.

Where three term control is desirable the pulse signals from the measuring bridge may be applied to a peak measuring device, such as a Field Effect Transistor, and the D.C. signals resulting from this may be applied to a conventional operational amplifier, the output from the amplifier being added to the linear ramp. In this way proportional, integral and derivative action can be achieved whilst maintaining the advantages of time proportioning and zero-voltage switching.

A single source of constant voltage pulses and a single source of pulses which increase in magnitude linearly throughout the time base may be used together to feed several temperature control and several power control circuit.

Figure 7:
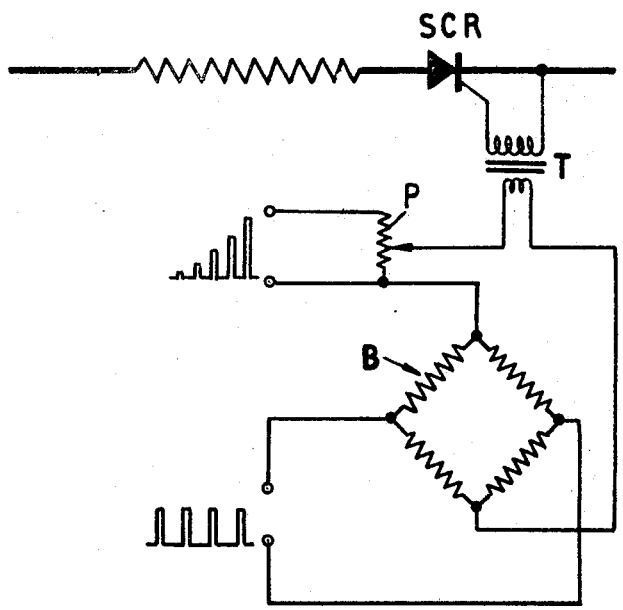
Figure 7A:
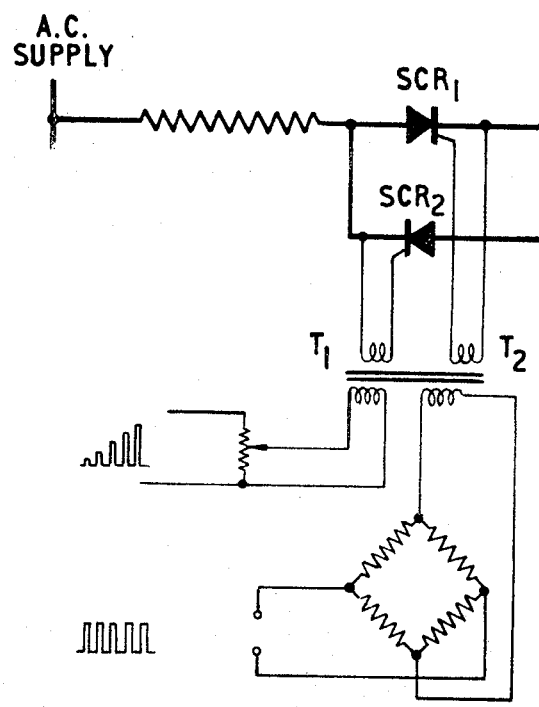
FIGURES 7A and 7B show modifications of the circuit of FIGURE 7.

FIGURE 7A shows a variation of the circuit of FIGURE 7 in which two controlled rectifiers $SCR_1$ and $SCR_2$ are used to give two-way control of the A.C. supply, the circuit arrangements for feeding each of the two transformers $T_1$, $T_2$ for these being the same as in FIGURE 7.

Figure 7B:
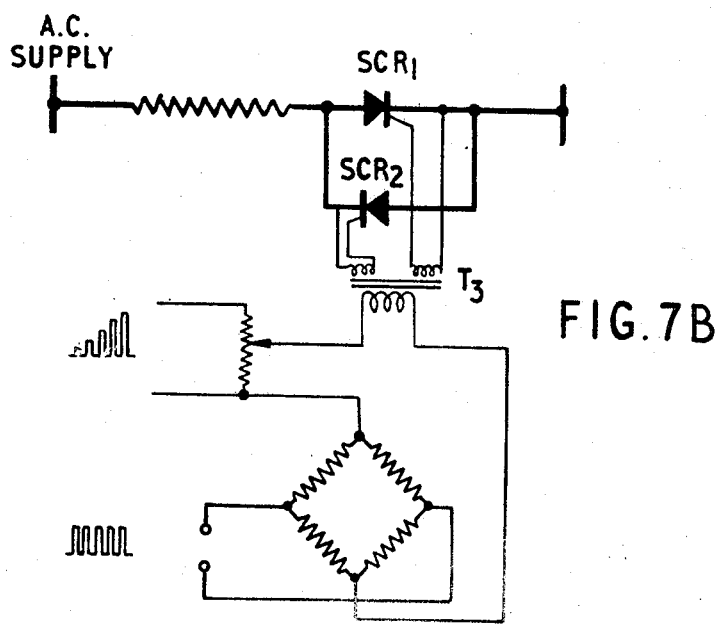

FIGURE 7B shows a modification of the circuit of FIGURE 7A in which two transformer secondaries of transformer $T_3$ feed the controlled rectifiers $SCR_1$ and $SCR_2$ respectively and a single primary circuit is used.

Various other modifications may be made within the scope of the invention. Thus, in an alternative arrangement the pulse output from the bridge may be applied to a F.E.T. differential amplifier, producing peak D.C. of sign depending upon the degree and sense of bridge imbalance: this D.C. may be used to set the level of origin of the pulse ramp.

Whilst reference has been made to using temperature sensors connected into bridge circuits the scope of this invention is not intended to be restricted to such applications, and the pulsed voltage supply may be used wherever the voltage drop across a resistance sensor, or current through a resistance sensor, is used to provide information about the temperature being measured.

Also the individual voltage pulses described may be replaced by repetitive high frequency pulses contained within an envelope which exists at the time that the supply voltage passes through zero.

Also the pulses may be shifted in phase to match the requirements of inductive or capacitative loads.

The invention is also applicable when a relay is used to control the load instead of silicon controlled rectifiers.

Also, some form of amplifier circuit may be used between the temperature dependent signal and the point at which it is actually applied to the SCR or relay.

I claim:

1. An electrical power control circuit comprising a monostable power switching device triggerable by firing pulses from a high impedance stable condition to a low impedance unstable condition; an alternating current power supply circuit extending to the device; a temperature-sensing circuit which includes a resistor whose ohmic value is sensed by low energy current impulses and used to alter the amplitude of trigger pulses; and electrical circuitry means arranged and connected whereby firing pulses are applied to said switching device in synchronism with the passage through zero of the power supply voltage when a threshold level is exceeded by the amplitude of the trigger pulses and whereby the low energy current impulses coincide with the passages through zero of the power supply voltage.

2. A circuit as set forth in claim 1, in which the trigger pulses are applied directly to the switching device which switches to its low impedance condition when the trigger pulse magnitude exceeds a threshold firing voltage level.

3. A circuit as set forth in claim 1, in which the electrical circuitry means includes an amplifier having its output connected to apply firing pulses to the device.

4. A circuit as set forth in claim 2, including ramp generating circuitry providing a repetitively recurring linear ramp train of pulses each coinciding with the passage through zero of the power supply voltage, and an adding circuit which provides the trigger pulses by adding to the ramp train of pulses voltages produced by said current impulses which are synchronized with the pulses of said train.

5. A circuit as set forth in claim 4, in which the adding circuit includes a resistive bridge network having the resistor in one arm and having one pair of diagonally opposite terminals connected to a source of pulses and the other pair of diagonally opposite terminals connected through a transformer to a firing electrode of the switching device.

6. A circuit as set forth in claim 5, in which the transformer coupling has a primary winding connected in series with a wiper of a potentiometer connected across the generating circuitry to receive the linear ramp train of pulses.

7. A circuit as set forth in claim 6, in which the transformer has two secondary windings associated with respective silicon-controlled rectifier switching devices arranged in opposed parallel relationship to conduct, respectively, opposite half cycles of the alternating current supply when fired by applied firing pulses.

8. A circuit as set forth in claim 1, in which the switching device comprises a silicon-controlled rectifier.

9. A circuit as set forth in claim 1, in which the resistor has a negative temperature coefficient.

References Cited

UNITED STATES PATENTS

| 3,304,441 | 2/1967 | Pelt | 307—310 |
| 3,307,042 | 2/1967 | Fogleman | 323—24 X |
| 3,307,094 | 2/1967 | Ogle | 323—24 X |
| 3,340,460 | 9/1967 | Clarke et al. | |
| 3,386,026 | 5/1968 | Gutterman | |

LEE T. HIX, Primary Examiner

A. D. PELLINEN, Assistant Examiner

U.S. Cl. X.R.

323—24, 40; 307—310